UNITED STATES PATENT OFFICE.

CARL IMMERHEISER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, BAVARIA, GERMANY, A CORPORATION.

COLORING-MATTER LAKE.

No. 833,602.       Specification of Letters Patent.       Patented Oct. 16, 1906.

Application filed August 6, 1904. Serial No. 219,776.

*To all whom it may concern:*

Be it known that I, CARL IMMERHEISER, doctor of philosophy and chemist, a subject of the King of Bavaria, residing at Ludwigshafen-on-the-Rhine, in the Kingdom of Bavaria, German Empire, have invented new and useful Improvements in Coloring-Matter Lakes, of which the following is a specification.

My invention relates to the manufacture of new alumina lakes with acid coloring-matter.

The method of producing lakes from acid coloring-matters has hitherto consisted in precipitating the coloring-matters by means of salts of metals—such as barium, calcium, and lead—occasionally with the addition of alkali in the presence of a substratum composed of alumina, heavy spar, and the like. Attempts to produce lakes containing no other metal but aluminum by making use either of alumina or of aluminum salts have only resulted in lakes which are not sufficiently fast, and consequently of little or no use in the arts.

I have now discovered that aluminum lakes which possess excellent fastness against the action of water can be produced by combining the coloring-matter with a mixture of alumina and of aluminum salt. It is essential that both alumina and a salt be used, for on mixing, for instance, free naphthol yellow acid with excess of alumina only partial precipitation takes place, a part of the coloring-matter remaining in solution; but on adding a little aluminum chlorid or hydrochloric acid to the mixture the precipitation becomes complete. Thus, to insure a complete precipitation it is necessary to have present a basic aluminum salt. Every basic salt is not suitable; but I have discovered that it is necessary to have present between one-sixth and one twenty-fourth of the quantity of acid which would be sufficient to produce with the alumina a neutral salt. The quantity of acid necessary also depends on the nature of the acid. For instance, for a given quantity of alumina more sulfuric acid is necessary to obtain the best result than is the case if hydrochloric acid or nitric acid be employed. Thus the basic aluminum sulfate, which is generally prepared by precipitation from a solution of aluminum sulfate or of alum by the addition of soda and which is frequently used instead of alumina in the preparation of lakes, although it contains about one-twelfth of the quantity of acid necessary to neutralize the whole of the alumina, is too basic to form insoluble lakes and requires the addition of more acid to form my new fast lakes.

The most suitable basic aluminum salts for use according to my invention are those of hydrochloric acid, nitric acid, acetic acid, and sulfo-cyanic acid.

The basic alumina compounds which form the lakes can either be prepared first, or they can be formed during the production of the lake itself—that is to say, in the presence of the coloring-matter. In order to prepare them, alumina, or the above-mentioned basic sulfate of aluminum, or any similar compound of aluminum which may be too strongly basic for the purposes of my invention, and consequently does not combine with the acid coloring-matters to yield the insoluble lakes, can be treated with the quantity of hydrochloric acid, or nitric acid, or acetic acid, ascertained as hereinbefore indicated, or, on the other hand, neutral salts of alumina with the acids mentioned or salts which are insufficiently basic can be treated with the corresponding quantity of an alkali, or of alumina, or of basic aluminum sulfate till the same result is obtained.

A further method of preparing these lake-forming basic aluminum salts consists in adding to the above-mentioned basic aluminum sulfate, at an elevated temperature, certain quantities of barium or lead, salts of hydrochloric acid, nitric acid, or acetic acid. Under these conditions the basic aluminum sulfate is converted into an aluminum salt of the required basicity, since the quantity of hydrochloric acid, or nitric acid, or acetic acid present is sufficient for the purpose indicated, whereas its equivalent of sulfuric acid, which is now precipitated as insoluble sulfate, was not sufficient. It is evident that the barium and lead do not take part in the lake formation, but only form insoluble sulfates, and so increase the amount of substratum present.

The formation of the lakes generally takes place in the cold, but can sometimes be assisted by warming.

The basic aluminum salts can be used as such for the production of lakes, or they can be employed in conjunction with other indifferent substrata. It is not necessary to make use of the soluble salts of the coloring-matters, as the more or less insoluble salts, or even the free acids themselves, can be used in solution or suspension.

The new lakes obtained according to the present invention do not contain any other metal than aluminum, and such lakes have never previously been obtained. Of course the new alumina lakes can be precipitated together with a substratum containing some other metal, (see, for instance, the last part of Example 2,) or the finished lake can be mixed, if desired, with such a substratum; but the lake itself as distinguished from the substratum contains no other metallic element except aluminum. This can readily be ascertained by chemists by treating the entire mixture with a reagent which will decompose the lake while not attacking the substratum. Thus, for instance, all the lakes that can be obtained according to the following examples can be decomposed by boiling with strong hydrochloric acid, which has no effect on the substratum. Upon filtering, the solution contains the metallic element of the lake, while the precipitate which remains in the filter consists of the substratum. Upon testing the filtrate it will be found to contain no other metal than aluminum.

The following examples will serve to further illustrate the nature of my invention, which, however, is not limited to these examples. The parts are, by weight.

Example 1: Mix together a solution of one (1) part of light green SF with two hundred (200) parts of a paste of aluminum hydrate, containing four (4) per cent. of $Al_2O_6H_6$. No lake formation up to this takes place, but on adding eight (8) parts of dilute hydrochloric acid, containing three and six-tenths (3.6) per cent. of HCl, the coloring-matter is immediately precipitated as an insoluble lake, which is intensely green and can be used either as paste or in the condition of powder.

Example 2: Mix together a solution of one (1) part of naphthol yellow S in water with two hundred (200) parts of a paste of aluminum hydrate, containing four (4) per cent. of $Al_2O_6H_6$. The said two components do not form a lake, but on adding to them about eight-tenths (0.8) of a part of aluminum chlorid ($Al_2Cl_6 + 12H_2O$) dissolved in water the coloring-matter is immediately precipitated as an insoluble lake, which is intensely yellow and very transparent. Instead of using the aluminum chlorid of this example equivalent quantities of aluminum sulfate and barium chlorid can be used, the barium sulfate being precipitated and taking no further part in the reaction, while the aluminum chlorid remains to assist in the formation of the basic salt.

Example 3: Mix together a solution of one (1) part of naphthol yellow in water with two hundred (200) parts of a four (4) per cent. paste of basic aluminum sulfate, such as can be obtained by the addition of sodium carbonate to a solution of aluminum sulfate. Now add a solution in water of one and two-tenths (1.2) parts of aluminum chlorid and boil for five (5) minutes. The lake, which can be isolated according to the usual method, is intensely yellow, insoluble in water, and possesses an exceptional transparency.

Example 4: Mix the coloring-matter acid which can be precipitated from two (2) parts of Eosin LA with four hundred (400) parts of a four (4) per cent. paste of the basic aluminum sulfate, containing about one (1) part of $H_2SO_4$ for every four (4) parts of $Al_2O_3$. No lake formation up to this takes place; but on adding to the mixture six (6) parts of nitric acid, containing ten (10) per cent. of $HNO_3$, and warming slightly the lake is rapidly formed. It is brilliant red and insoluble in water.

Example 5: Mix together while cold two hundred (200) parts of a four (4) per cent. paste of basic aluminum sulfate and four and a half (4.5) parts of hydrochloric acid, containing about three and a half (3.5) per cent. of HCl, whereupon the basic aluminum salt suitable for the formation of lakes according to this invention is formed. Now add a solution of one (1) part of brilliant carmine L in sixty (60) parts of water, whereupon the fiery blue-red lake is immediately precipitated.

Example 6: Mix together a solution, in water, of one (1) part of naphthol yellow S with two hundred (200) parts of a four (4) per cent. paste of basic aluminum sulfate. The formation of an insoluble lake does not up to this take place; but by adding two (2) parts of barium chlorid (that is, twice as much as is necessary to form the barium salt of the coloring-matter) and warming and then boiling for a short time the true insoluble naphthol yellow lake is formed. This lake can also be produced by using instead of the soluble sodium salt the comparatively difficultly soluble barium salt of naphthol yellow and then employing a correspondingly-smaller quantity of barium chlorid. Instead of the barium chlorid another barium salt or a lead salt of the acids indicated can be employed to convert the basic aluminum sulfate into the lake-forming material and precipitate the sulfuric acid.

Example 7: Dissolve two (2) parts of Eosin LA in about fifty (50) parts of water, mix with this one hundred and fifty (150) parts of a four (4) per cent. paste of basic aluminum sulfate, fifty (50) parts of a ten

(10) per cent. paste of precipitated barium sulfate, (permanent white,) and then add four (4) parts of barium chlorid. Boil the whole until the lake is formed. This coloring-matter lake can be separated in the usual manner and can be used either as a paste or in the form of powder.

Example 8: Mix together one hundred and fifty (150) parts of a four (4) per cent. paste of basic aluminum sulfate and fifty (50) parts of a ten (10) per cent. paste of precipitated barium sulfate (permanent white) and add to the mixture first a solution in water of two (2) parts of patent blue A and then a solution of four (4) parts of barium chlorid. Boil the whole until the formation of the lake is completed. The lake so obtained possesses a pure-blue color and is very fast against the action of water.

Now what I claim is—

1. The process for the production of coloring-matter lakes containing no other metal than aluminum, by mixing an acid coloring-matter with a hereinbefore-described basic aluminum salt which contains substantially between one-sixth and one twenty-fourth of the acid necessary to form a neutral salt.

2. The new composition of matter being a coloring-matter lake containing an acid coloring-matter and a hereinbefore-described basic aluminum salt which contains substantially between one-sixth and one twenty-fourth of the acid necessary to form a neutral salt.

3. The new composition of matter being a coloring-matter lake containing an acid coloring-matter, a substratum and a hereinbefore-described basic aluminum salt which contains substantially between one-sixth and one twenty-fourth of the acid necessary to form a neutral salt.

4. The new composition of matter being a coloring-matter lake containing naphthol yellow and a hereinbefore-described basic aluminum salt which contains substantially between one-sixth and one twenty-fourth of the acid necessary to form a neutral salt.

In testimony whereof I have hereunto set my hand in the presence of two subscribing witnesses.

CARL IMMERHEISER.

Witnesses:
J. ALEC. LLOYD,
JOSEPH H. SEUTE.